United States Patent
Martin, Jr. et al.

(10) Patent No.: US 8,667,382 B2
(45) Date of Patent: Mar. 4, 2014

(54) CONFIGURABLE FIELD DEFINITION DOCUMENT

(75) Inventors: James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 1674 days.

(21) Appl. No.: 11/427,011

(22) Filed: Jun. 28, 2006

(65) Prior Publication Data

US 2008/0005165 A1    Jan. 3, 2008

(51) Int. Cl.
*G06F 17/20* (2006.01)

(52) U.S. Cl.
USPC ........................................................ 715/221

(58) Field of Classification Search
USPC ................................................. 715/221–222
See application file for complete search history.

(56) References Cited

U.S. PATENT DOCUMENTS

| | | | |
|---|---|---|---|
| 5,235,654 A | 8/1993 | Anderson et al. | |
| 5,265,221 A | 11/1993 | Miller | |
| 5,555,325 A | 9/1996 | Burger | |
| 5,966,531 A * | 10/1999 | Skeen et al. | 719/315 |
| 6,557,008 B1 * | 4/2003 | Temple et al. | 707/104.1 |
| 6,589,290 B1 * | 7/2003 | Maxwell et al. | 715/224 |
| 6,651,217 B1 * | 11/2003 | Kennedy et al. | 715/224 |
| 6,874,120 B2 * | 3/2005 | Le et al. | 715/224 |
| 6,950,981 B2 * | 9/2005 | Duffy et al. | 715/222 |
| 6,996,558 B2 * | 2/2006 | Dettinger et al. | 1/1 |
| 7,308,646 B1 * | 12/2007 | Cohen et al. | 715/236 |
| 7,500,178 B1 * | 3/2009 | O'Donnell | 715/221 |
| 7,620,665 B1 * | 11/2009 | George et al. | 1/1 |
| 2002/0103826 A1 * | 8/2002 | Kriho et al. | 707/505 |
| 2002/0178233 A1 * | 11/2002 | Mastrianni et al. | 709/217 |
| 2003/0055697 A1 * | 3/2003 | Macken et al. | 705/7 |
| 2003/0188262 A1 * | 10/2003 | Maxwell et al. | 715/507 |
| 2003/0192028 A1 * | 10/2003 | Gusler et al. | 717/101 |
| 2003/0204637 A1 * | 10/2003 | Chong | 709/310 |
| 2004/0068715 A1 * | 4/2004 | Wong et al. | 717/136 |
| 2004/0083426 A1 * | 4/2004 | Sahu | 715/505 |
| 2004/0122865 A1 * | 6/2004 | Stahl et al. | 707/104.1 |
| 2004/0172585 A1 | 9/2004 | Nelson | |
| 2004/0181753 A1 * | 9/2004 | Michaelides | 715/523 |
| 2004/0186785 A1 * | 9/2004 | Basil et al. | 705/26 |
| 2004/0236715 A1 * | 11/2004 | Krebs | 707/1 |
| 2004/0261024 A1 * | 12/2004 | Storisteanu | 715/530 |
| 2004/0267581 A1 * | 12/2004 | Krishnamurthy et al. | 705/7 |
| 2005/0027846 A1 * | 2/2005 | Wolfe et al. | 709/223 |
| 2005/0080756 A1 * | 4/2005 | Hitchcock et al. | 707/1 |
| 2005/0165817 A1 * | 7/2005 | O'Conor | 707/101 |

(Continued)

FOREIGN PATENT DOCUMENTS

WO    WO 2004077215 A2 *   9/2004

*Primary Examiner* — Frank D Mills
(74) *Attorney, Agent, or Firm* — Lisa Ulrich; Hoffman Warnick LLC

(57) ABSTRACT

The present invention provides a configurable field definition document as well as a method, system and program product for configuring a field definition document. Specifically, under the present invention, fields of the field definition document are configured to store values of data elements used by a computer application. The computer application is then mapped to the fields. As needed, values of data elements for the computer application are accessed from the field definition document based on the mapping and at least one selection criterion. The at least one selection criterion can include, for example, a customer identity, a location, a language, a project type, etc.

30 Claims, 3 Drawing Sheets

| GENERAL | 44 |
|---|---|
| FIELD NAME | FL_MigrationStatus |
| FIELD DESCRIPTION | Migration Status |
| KEYWORD VALUES (48) | CEASED KA Ceased<br>Complete KA Complete<br>Progress I KA InProgress       50<br>Not Scheduled I KA NotScheduled<br>Scheduled I KA Scheduled<br>Tier Type Has Changed I KA TierTypeHasChanged |
| DEFAULT VALUE | |
| VALUE CHANGE PROCESSING | |
| VALIDATE VALUE CHANGE? | ○YES ⊙NO |
| VALUE CHANGE LOGGING | |
| LOG CHANGED VALUES? | ○YES ⊙NO |
| INPUT VALIDATION | |
| VALIDATION TYPE | NONE |

(56) References Cited

U.S. PATENT DOCUMENTS

| | | | |
|---|---|---|---|
| 2005/0262105 A1* | 11/2005 | DelGaudio et al. | 707/10 |
| 2006/0080082 A1* | 4/2006 | Ravindra et al. | 704/8 |
| 2006/0129419 A1* | 6/2006 | Flaxer et al. | 705/1 |
| 2006/0129518 A1* | 6/2006 | Andreev et al. | 707/1 |
| 2006/0225032 A1* | 10/2006 | Klerk et al. | 717/105 |
| 2006/0251073 A1* | 11/2006 | Lepel et al. | 370/392 |
| 2006/0282473 A1* | 12/2006 | Horrocks et al. | 707/200 |
| 2006/0288269 A1* | 12/2006 | Oppenlander et al. | 715/505 |
| 2007/0022094 A1* | 1/2007 | Hicks et al. | 707/3 |
| 2007/0061355 A1* | 3/2007 | Carey et al. | 707/102 |
| 2007/0065011 A1* | 3/2007 | Schiehlen | 382/181 |
| 2007/0075916 A1* | 4/2007 | Bump et al. | 345/3.1 |
| 2007/0100897 A1* | 5/2007 | Kelly et al. | 707/200 |
| 2007/0179983 A1* | 8/2007 | Putman | 707/200 |
| 2007/0198968 A1* | 8/2007 | Shenfield et al. | 717/104 |
| 2007/0245332 A1* | 10/2007 | Tal et al. | 717/168 |
| 2007/0282616 A1* | 12/2007 | Brunswig et al. | 705/1 |
| 2007/0282782 A1* | 12/2007 | Carey et al. | 707/1 |
| 2008/0040659 A1* | 2/2008 | Doyle | 715/236 |
| 2008/0313535 A1* | 12/2008 | Storisteanu | 715/256 |
| 2009/0055421 A1* | 2/2009 | Lier | 707/101 |
| 2009/0132955 A1* | 5/2009 | Garg et al. | 715/781 |
| 2009/0228449 A1* | 9/2009 | Irons | 707/3 |

\* cited by examiner

| GENERAL | 44 |
|---|---|
| FIELD NAME | FL_FieldName |
| FIELD DESCRIPTION | FL_FieldDescription |
| KEYWORD VALUES | FL_KeywordValues |
| DEFAULT VALUE | FL_DefaultValue |

46 → GENERAL
48 → KEYWORD VALUES
50 → FL_KeywordValues

| MULTIPLE SOURCE IMPORT | |
|---|---|
| RESULT OF MULTIPLE SOURCE IMPORT | FL_MultipleSource |
| IMPORT SOURCES | FL_ImportSource |
| PREFERRED SOURCE | FL_PreferredSource |

| VALUE CHANGE PROCESSING | |
|---|---|
| VALIDATE VALUE CHANGE? | FL_ValidateValueChange |
| IGNORE NEW FIELD | FL_IgnoreNew |
| IGNORE IF CURRENTLY BLANK | FL_IgnoreBlank |
| ADDITIONAL FIELDS | FL_AdditionalValidationFields |

| VALUE CHANGE LOGGING | |
|---|---|
| LOG CHANGED VALUES? | FL_LogChanges |
| LOG EVENT | FL_LogEvent |
| ADDITIONAL FIELDS | FL_AdditionalFields |

| INPUT VALIDATION | |
|---|---|
| VALIDATION TYPE | FL_ValidationType |
| RANGE MINIMUM | FL_RangeMinimum |
| RANGE MAXIMUM | FL_RangeMaximum |
| RANGE ERROR MESSAGE | FL_RangeErrorMessage |

MODIFICATION HISTORY:

| FL_UpdatedBy | FL_UpdatedOn | FL_UpdateReason |
|---|---|---|

FIG. 2

| GENERAL | 44 |
|---|---|
| FIELD NAME | FL_MigrationStatus |
| FIELD DESCRIPTION | Migration Status |
| KEYWORD VALUES — 48 | CEASED KA_Ceased<br>Complete KA_Complete<br>Progress \| KA_InProgress  ← 50<br>Not Scheduled \| KA_NotScheduled<br>Scheduled \| KA_Scheduled<br>Tier Type Has Changed \| KA_TierTypeHasChanged |
| DEFAULT VALUE | |
| VALUE CHANGE PROCESSING | |
| VALIDATE VALUE CHANGE? | ○ YES  ⊙ NO |
| VALUE CHANGE LOGGING | |
| LOG CHANGED VALUES? | ○ YES  ⊙ NO |
| INPUT VALIDATION | |
| VALIDATION TYPE | NONE |

FIG. 3

CONFIGURABLE FIELD DEFINITION DOCUMENT

FIELD OF THE INVENTION

In general, the present invention relates to a field definition document for a computer application. Specifically, the present invention relates to a configurable field definition document as well as a method, system and program product for configuring and using a field definition document.

BACKGROUND OF THE INVENTION

As Information Technology (IT) continues to advance, many organizations are faced with the task of migrating their existing computer infrastructures, telephone systems and the like to newer technology. For example, an organization might wish to migrate its networking functions from token ring to Ethernet. Similarly, an organization might wish to migrate its telephone service from landline-based service to voice-over-IP service.

An IT migration may not only involve adding components such as hardware or software, but it can also involve the physical relocation of existing devices and/or components. Moreover, a single organization that performs IT migrations for customers might be doing so simultaneously for many customers. As such, there is a strong need to provide effective management of the IT migrations. To this extent, IT migration providers typically utilize one or more computer applications that allow them to manage the scheduling and other details of the IT migrations. Unfortunately, the details of an IT migration can be highly dependent on a particular customer. For example, not only might different customers require different reporting and status information, but they could also communicate in different languages. For example, customer A might communicate in English, while customer B might communicate in Spanish. Moreover, the technical details of an IT infrastructure being migrated commonly vary from customer to customer. To date, such customer details have been hard-coded into the underlying application(s) used to manage the IT migrations. However, this requires constant modification and coding of the application(s). It also requires some level of expertise with programming or the actual application(s).

In view of the foregoing there exists a need for a solution that solves at least one of the deficiencies of the related art.

SUMMARY OF THE INVENTION

In general, the present invention provides a configurable field definition document as well as a method, system and program product for configuring and using a field definition document. Specifically, under the present invention, fields of the field definition document are configured to store values of data elements used by a computer application. The computer application is then mapped to the fields. As needed, values of data elements for the computer application are accessed from the field definition document based on the mapping and at least one selection criterion. The at least one selection criterion can include, for example, a customer identity, a location, a language, a project type, etc.

A first aspect of the present invention provides a method for configuring a field definition document, comprising: configuring fields of the field definition document to store values of data elements used by a computer application; mapping the computer application to the fields; and accessing a value of a data element for the computer application from the field definition document based on the mapping and at least one selection criterion.

A second aspect of the present invention provides a system for configuring a field definition document, comprising: a system for configuring fields of the field definition document to store values of data elements used by a computer application; a system for mapping the computer application to the fields; and a system for accessing a value of a data element for the computer application from the field definition document based on the mapping and at least one selection criterion.

A third aspect of the present invention provides a program product stored on a computer readable medium for configuring a field definition document, the computer readable medium comprising program code for causing a computer system to perform the following functions: configure fields of the field definition document to store values of data elements used by a computer application; map the computer application to the fields; and access a value of a data element for the computer application from the field definition document based on the mapping and at least one selection criterion.

A fourth aspect of the present invention provides a method for deploying a system for configuring a field definition document, comprising: providing a computer infrastructure being operable to: configure fields of the field definition document to store values of data elements used by a computer application; map the computer application to the fields; and access a value of a data element for the computer application from the field definition document based on the mapping and at least one selection criterion.

A fifth aspect of the present invention provides a configurable field definition document, comprising: a set of fields for storing values of data elements used by a computer application; wherein the computer application is mapped to the set of fields; and wherein values of data elements for the computer application are accessed from the set of fields based on the mapping and at least one selection criterion.

A sixth aspect of the present invention provides computer software embodied in a propagated signal for configuring a field definition document, the computer software comprising instructions for causing a computer system to perform the following functions: configure fields of the field definition document to store values of data elements used by a computer application; map the computer application to the fields; and access a value of a data element for the computer application from the field definition document based on the mapping and at least one selection criterion.

A seventh aspect of the present invention provides a business method for configuring a field definition document.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a first view of a field definition document according to the present invention.

FIG. 3 depicts a second view of a field definition document according to the present invention.

Figure 1:
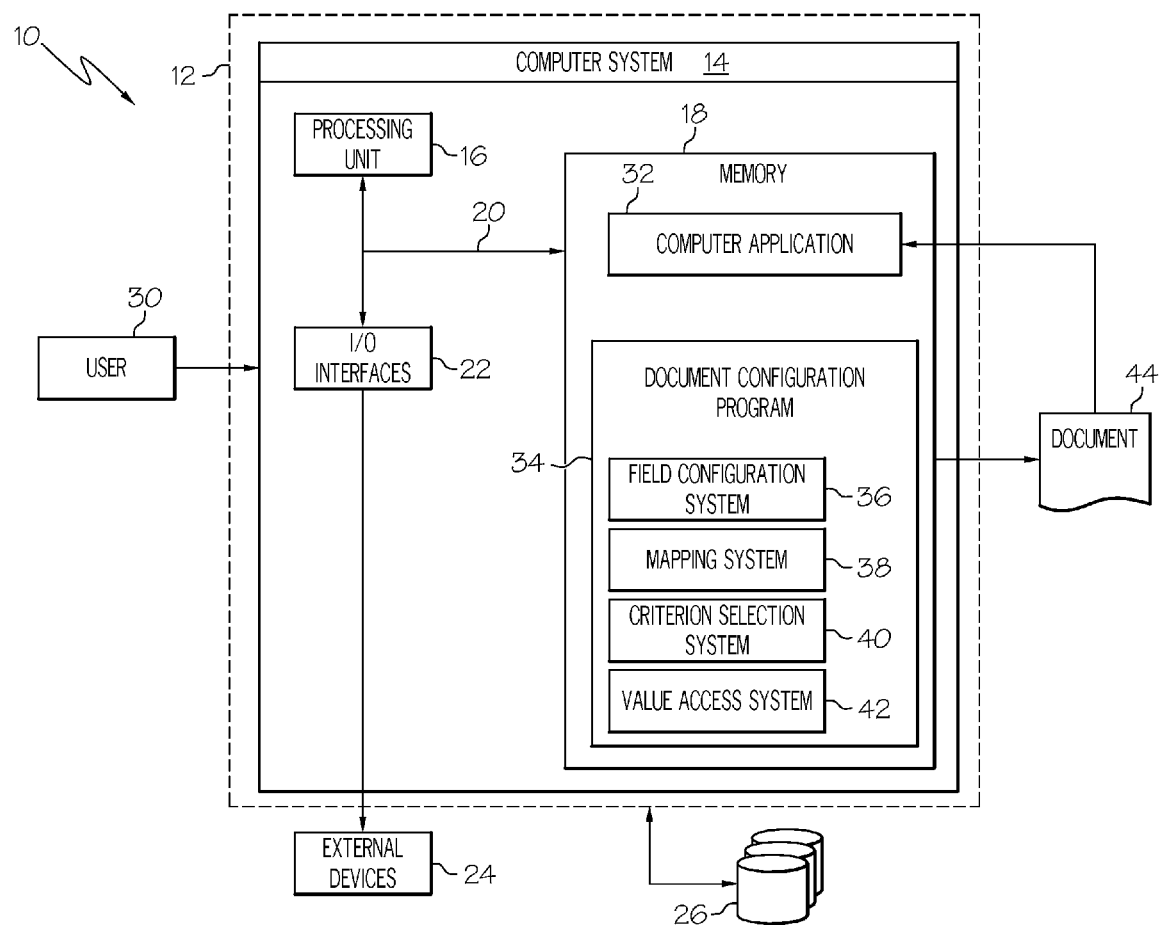
FIG. 1 depicts a system for configuring a field definition document according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a configurable field definition document as well as a method, system and program product for configuring a field definition document. Specifically, under the present invention, fields of the field definition document are configured to store values of data elements used by a computer application. The computer application is then mapped to the fields. As needed, values of data elements for the computer application are accessed from the field definition document based on the mapping and at least one selection criterion. The at least one selection criterion can include, for example, a customer identity, a location, a language, a project type, etc.

Referring now to FIG. 1, a more detailed diagram of a computerized implementation 10 of the present invention is shown. As depicted, implementation 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of implementation 10 could be deployed, managed, serviced, etc. by a service provider who offers to implement and/or perform the functions of the present invention for others.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as computer application 32 and document configuration program 34, which is stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server.

Similarly, memory 18 and/or storage system 26 can comprise any combination of various types of data storage and/or transmission media that reside at one or more physical locations. Further, I/O interfaces 22 can comprise any system for exchanging information with one or more external interfaces 24. Still further, it is understood that one or more additional components (e.g., system software, math co-processing unit, etc.) not shown in FIG. 1 can be included in computer system 14. However, if computer system 14 comprises a handheld device or the like, it is understood that one or more external interfaces 24 (e.g., a display) and/or storage system 26 could be contained within computer system 14, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). In addition, although not shown, additional components, such as cache memory, communication systems, system software, etc., may be incorporated into computer system 14.

Shown in memory 18 of computer system 14 is computer application 32 that can represent any type of computer application now known or later developed. In one embodiment of the invention, computer application 32 is an application that manages the scheduling, details, etc., of an IT migration. Also shown in memory is document configuration program 34 that configures a field definition document (hereinafter document 44) that contains values of data elements used by computer application 32. Specifically, document configuration program 34 creates and maintains document 44 of values of data elements used by computer application 32 so that computer application 32 does not have to be re-coded, altered, etc. to accommodate specific values. For example, a single migration status can have several different terms to indicate the same status (customer A might prefer a pending IT migration to be indicated as "Open", while customer B might prefer a pending IT migration to be indicated as "In Progress"). Such differences can not only apply to reporting details such as these, but also technical differences between IT infrastructures, languages spoken, physical locations of customers and/or infrastructure components, a project type such as whether the project being managed is an IT migration or some or other type of project such as an expansion of existing infrastructure.

As mentioned above, such details previously had to be hard-coded into computer application 32, which was not only labor intensive and potentially error prone, but also required a level of expertise in programming. Along these lines, document 44 is provided and configured by the present invention for access by computer application 32. Thus, eliminating the need to hard-code such values into computer application 32.

As shown, document configuration program 34 includes field configuration system 36, mapping system 38, criterion selection system 40, and value access system 42. Field configuration system 36 generates and/or configures document 44 to store a set (e.g., one or more) of values of a set of data elements used by computer application 32. Referring to FIG. 2, an illustrative view of document 44 is shown. As depicted, document 44 includes a set of fields 46 that can be configured to store one or more data values for one or more data elements used by computer application 32 (FIG. 1). For example, the data element 48 "Keyword Values" could have multiple possible data values 50. This is shown in FIG. 3 in which the data element "Keyword Values" 48 has the data values 50 of "Ceased|KA_Ceased", "Completed|KA_Complete", "In Progress|KA_InProgress", "Not Scheduled|KA_NotScheduled", "Scheduled|KA_Scheduled", "Tier Type Has Changed|KA_TierTypeHasChanged". These values 50 typically pertain to an IT migration, however, it should be understood that document 44 could be used to store values for any type of project.

In any event, referring back to FIG. 1, once user 30 has configured document 44, it will be mapped to computer application 32 by mapping system 38. Specifically, the fields 46 containing data values 50 will be mapped to specific data elements or other parts of computer application 32. In a typical embodiment, the mapping will be such that components of computer application 32 needing values for data elements will be mapped to corresponding fields of document 44. For example, a component of computer application 32 dealing with the status of an IT migration can be mapped to the field 46 of document 44 containing values 50 set forth above. The mapping could be further defined based on any type of selection criterion such as a customer identity, a location, a language, a project type, etc. For example, a customer file in computer application 32 that is for customer A's migration could be mapped to a status of "Open", while a customer file for customer B's migration could be mapped to a status of "In Progress". Along these lines, a single data element used by computer application 32 or a component thereof, could actually be mapped to multiple possible values.

In any event, assume now that computer application 32 needs to access one or more data values to perform its functions. Criterion selection system 40 can be utilized by user 30 to select at least one selection criterion by which a specific data value will be selected. Such criterion(s) can be any type of criterion(s) that can affect which data value is selected. For example, criterion(s) could include a language (e.g., Spanish), a customer identity (e.g., customer A), a location (e.g., Northern Spain), a project type (e.g., IT migration), etc. Once any needed/desired criterion(s) have been selected, value access system 42 will access/retrieve the appropriate data value(s) from document 44 based on the mapping and the criterion(s) for computer application 32.

It should be understood that although computer application 32 and document configuration program 34 are shown as two separate elements, this need not be the case. For example, document configuration program 34 can be incorporated within computer application 32, could be a plug-in for computer application 32, etc. Under the present invention, document 44 is configurable independent of computer application 32, thus, eliminating the need to hard-code the data values into computer application 32. It should also be appreciated that document 44 could also be used to store error messages and the like. For example, if user 30 attempts to select an improper data value (e.g., the wrong language), value accesses system could access/retrieve an appropriate error message.

While shown and described herein as a configurable field definition document as well as a method, system and program product for configuring a field definition document, it is understood that the invention further provides various alternative embodiments. For example, in one embodiment, the invention provides a computer-readable/useable medium that includes computer program code to enable a computer infrastructure to create and/or configure a field definition document. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to create and/or configure a field definition document. In this case, the service provider can create, deploy, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for creating and/or configuring a field definition document. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for configuring a field definition document, comprising:
   configuring a field definition document for one of a plurality of fields used by a computer application to control operational functions of the computer application by defining attributes for a data element of the one of the plurality of fields in the field definition document and defining different attributes for the data element of the one of the plurality of fields in the field definition document;
   mapping the computer application to the fields;
   accessing the attributes for the data element of the computer application from the field definition document based on the mapping and at least one first selection criterion; and
   accessing the different attributes for the data element of the computer application from the field definition document based on the mapping, the at least one first selection criterion, and at least one second selection criterion, wherein each of the first selection criterion and the second selection criterion comprises a project type.

2. The method of claim 1, wherein a single data element used by the application can be associated with multiple possible values in the field definition document.

3. The method of claim 1, wherein the mapping associates the data elements used by the computer application with the values stored in the accessed field definition document.

4. The method of claim 1, wherein the computer application pertains to an Information Technology migration.

5. The method of claim 1, wherein the computer application is configured independently of the field definition document.

6. The method of claim 1, further comprising configuring the field definition document to store error messages used by the computer application.

7. The method of claim 1, wherein the computer application pertains to an Information Technology expansion.

8. A system for configuring a set of field definition document having at least one computer device, the computer device having one of a processor or a computer that performs a method, comprising:
   configuring a field definition document for one of a plurality of fields used by a computer application to control operational functions of the computer application by defining attributes for a data element of the one of the plurality of fields in the field definition document and defining different attributes for a second data element of the one of the plurality of fields in the field definition document;
   mapping the computer application to the fields; and
   accessing the attributes for the data element of the computer application from the field definition document based on the mapping, at least one first selection criterion, and at least one second selection criterion, wherein each of the first and second selection criterion comprises a project type; and
   accessing the different attributes for the second data element of the computer application from the field definition document based on the mapping and at least one second selection criterion.

9. The system of claim 8, wherein a single data element used by the application can be associated with multiple possible values in the field definition document.

10. The system of claim 8, wherein the system for mapping associates the data elements used by the computer application with the values stored in the accessed field definition document.

11. The system of claim 8, wherein the computer application pertains to an Information Technology migration.

12. The system of claim 8, wherein the computer application is configured independently of the field definition document.

13. The system of claim 8, wherein the field definition document is further configurable to store error messages used by the computer application.

14. The system of claim 8, wherein the computer application pertains to an Information Technology expansion.

15. A program product stored on a non-transitory computer readable storage device for configuring a field definition document, the computer readable medium comprising program code for causing a computer system to perform the following functions:
   configure a field definition document for one of a plurality of fields used by a computer application to control operational functions of the computer application by defining attributes for a data element of the one of the plurality of fields in the field definition document;
   map the computer application to the fields and defining different attributes for the data element of the one of the plurality of fields in the field definition document; and
   access the attributes for the data element of the computer application from the field definition document based on the mapping, at least one first selection criterion, and at least one second selection criterion, wherein each of the first and second selection criterion comprises a project type; and
   access the different attributes for the data element of the computer application from the field definition document based on the mapping and at least one second selection criterion.

16. The program product of claim 15, wherein a single data element used by the application can be associated with multiple possible values in the field definition document.

17. The program product of claim 15, wherein mapping the computer application to the fields associates the data elements used by the computer application with the values stored in the accessed field definition document.

18. The program product of claim 15, wherein the computer application pertains to an Information Technology migration.

19. The program product of claim 15, wherein the computer application is configured independently of the field definition document.

20. The program product of claim 15, wherein the computer readable medium further comprises program code for causing the computer system to perform the following function: configure the definition document to store error messages used by the computer application.

21. The program product of claim 15, wherein the computer application pertains to an Information Technology expansion.

22. A method for deploying a system for configuring a field definition document, comprising:
   providing a computer infrastructure being operable to:
      configure a field definition document for one of a plurality of fields used by a computer application to control operational functions of the computer application by defining attributes for a data element of the one of the plurality of fields in the field definition document;
      map the computer application to the fields; and access the attributes for the data element of the computer application from the field definition document based on the mapping, and at least one first selection criterion, and at least one second selection criterion, wherein each of the first and second selection criterion comprises a project type; and access the different attributes for the data element of the computer application from the field definition document based on the mapping and at least one second selection criterion.

23. The method of claim 22, wherein a single data element used by the application can be associated with multiple possible values in the field definition document.

24. The method of claim 22, wherein mapping the computer application to the fields associates the data elements used by the computer application with the values stored in the accessed field definition document.

25. The method of claim 22, wherein the computer application pertains to an Information Technology migration.

26. The method of claim 22, wherein the computer application is configured independently of field definition document.

27. The method of claim 22, further comprising configuring the field definition document to store error messages used by the computer application.

28. The method of claim 22, wherein the computer application pertains to an Information Technology expansion.

29. A computer device having a configurable field definition document, the computer device having one of a processor or a computer, comprising:
   a set of attributes for one of a plurality of fields used by a computer application to control operational functions of the computer application, the attributes being defined for a data element of the one of the plurality of fields in a field definition document;
   a set of different attributes for the one of a plurality of fields used by the computer application to control operational functions of the computer application, the different attributes being defined for the data element of the one of the plurality of fields in the field definition document;
   wherein the computer application is mapped to the set of fields; and
   wherein the attributes for a data element of the computer application are accessed from the set of fields in the field definition document selected based on the mapping, at least one selection criterion, and at least one second selection criterion, wherein each of the first and second selection criterion comprises a project type.

30. The computer device of claim 29, wherein the computer application pertains to an Information Technology expansion.

* * * * *